(12) United States Patent
Albin et al.

(10) Patent No.: US 8,414,043 B2
(45) Date of Patent: Apr. 9, 2013

(54) END EFFECTOR FOR MOBILE REMOTELY CONTROLLED ROBOT

(75) Inventors: Scott R. Albin, Carlisle, MA (US); Allan T. Fisk, Needham, MA (US)

(73) Assignee: Foster-Miller, Inc., Waltham, MA (US)

( * ) Notice: Subject to any disclaimer, the term of this patent is extended or adjusted under 35 U.S.C. 154(b) by 438 days.

(21) Appl. No.: 12/288,500

(22) Filed: Oct. 21, 2008

(65) Prior Publication Data

US 2010/0095799 A1 Apr. 22, 2010

(51) Int. Cl.
*B66C 1/00* (2006.01)
*B66C 1/42* (2006.01)

(52) U.S. Cl.
USPC ........................................................ 294/106

(58) Field of Classification Search ............... 294/106, 294/116; 74/490.03, 425, 434, 435, 437, 74/439, 22 A, 25; 901/1, 23, 25, 27–29, 901/31
See application file for complete search history.

(56) References Cited

U.S. PATENT DOCUMENTS

| | | | |
|---|---|---|---|
| 429,903 A | 6/1890 | Gregg | |
| 816,236 A | 3/1906 | Kline | |
| 832,541 A | 10/1906 | Dodge | |
| 1,350,124 A | 8/1920 | Venable | |
| 1,479,310 A | 1/1924 | Monroe | |
| 2,132,795 A | 10/1938 | William | |
| 2,221,192 A | 11/1940 | Juhl | |
| 2,594,763 A | 4/1952 | Freyer | |
| 2,613,100 A | 10/1952 | Casey, Jr. | |
| 2,617,203 A | 11/1952 | Murray | |
| 2,617,211 A | 11/1952 | Olson | |
| 2,665,434 A | 1/1954 | Saunders | |
| 2,710,765 A | 6/1955 | Arens | |
| 2,891,813 A | 6/1959 | Toyojiro | |
| 2,926,865 A | 3/1960 | Humphreys | |
| 3,042,440 A | 7/1962 | Weil, Sr. et al. | |
| 3,108,498 A | 10/1963 | Hedin et al. | |
| 3,202,449 A * | 8/1965 | Lemelson | 294/88 |
| 3,247,979 A | 4/1966 | Melton et al. | |
| 3,370,213 A * | 2/1968 | Rose | 318/513 |
| RE26,904 E | 5/1970 | Lemelson | |
| 3,558,177 A | 1/1971 | Snead | |
| 3,645,578 A | 2/1972 | Renfroe | |
| 3,765,347 A | 10/1973 | Tormstrom | |
| 3,866,966 A | 2/1975 | Skinner, II | |
| 3,914,884 A | 10/1975 | Guinot | |
| 3,920,137 A | 11/1975 | McCain | |

(Continued)

FOREIGN PATENT DOCUMENTS

| | | |
|---|---|---|
| EP | 24751 A1 | 3/1981 |
| WO | WO2004003680 | 1/2004 |
| WO | WO2007088206 | 8/2007 |

OTHER PUBLICATIONS

Written Opinion of the International Searching Authority, Application No. PCT/US2008/013608, mailed Feb. 11, 2009, 9 pgs. (unnumbered).

*Primary Examiner* — Dean Kramer
*Assistant Examiner* — Stephen Vu
(74) *Attorney, Agent, or Firm* — Iandiorio Teska & Coleman, LLP

(57) ABSTRACT

An end effector for a mobile, remotely controlled robot includes first and second fingers; each finger fixed to a gear segment for rotation therewith; and a drive subsystem driving the gear segments and the associated fingers between open and closed positions.

14 Claims, 8 Drawing Sheets

U.S. PATENT DOCUMENTS

| | | | |
|---|---|---|---|
| 3,952,880 A * | 4/1976 | Hill et al. | 414/5 |
| 4,000,784 A | 1/1977 | Morrow, Sr. et al. | |
| 4,062,455 A | 12/1977 | Flatau | |
| 4,097,084 A | 6/1978 | Russell | |
| 4,114,464 A | 9/1978 | Schubert et al. | |
| 4,281,866 A | 8/1981 | Atcheson | |
| 4,367,893 A | 1/1983 | Berg | |
| 4,370,091 A | 1/1983 | Gagliardi | |
| 4,456,293 A * | 6/1984 | Panissidi | 294/106 |
| 4,478,451 A | 10/1984 | Brucher et al. | |
| 4,489,969 A | 12/1984 | Merry | |
| 4,494,441 A | 1/1985 | Magnuson | |
| 4,501,522 A | 2/1985 | Causer et al. | |
| 4,512,524 A | 4/1985 | Shigemizu | |
| 4,600,355 A | 7/1986 | Johnson | |
| 4,600,357 A * | 7/1986 | Coules | 414/730 |
| 4,621,562 A | 11/1986 | Carr et al. | |
| D287,218 S | 12/1986 | Portz | |
| 4,645,409 A | 2/1987 | Gorman | |
| 4,648,464 A | 3/1987 | Huxley | |
| 4,678,220 A | 7/1987 | Gabriel | |
| 4,697,838 A | 10/1987 | Hartman | |
| 4,699,414 A | 10/1987 | Jones | |
| 4,709,265 A | 11/1987 | Silverman et al. | |
| 4,738,576 A | 4/1988 | Eberle et al. | |
| 4,766,775 A | 8/1988 | Hodge | |
| 4,773,298 A | 9/1988 | Tischer et al. | |
| 4,778,211 A | 10/1988 | Gabriel | |
| 4,784,422 A | 11/1988 | Jones et al. | |
| 4,810,019 A | 3/1989 | Brucher | |
| 4,822,233 A | 4/1989 | Hansel | |
| 4,822,238 A | 4/1989 | Kwech | |
| 4,865,400 A | 9/1989 | Caron et al. | |
| 4,932,831 A | 6/1990 | White et al. | |
| 4,941,416 A | 7/1990 | Faulring | |
| 4,993,914 A | 2/1991 | Riddle | |
| 5,024,397 A | 6/1991 | Edwards et al. | |
| 5,033,785 A | 7/1991 | Woolley, Jr. | |
| 5,060,378 A | 10/1991 | LaBounty et al. | |
| 5,063,628 A | 11/1991 | Campbell | |
| 5,081,941 A | 1/1992 | Weeks | |
| 5,098,024 A | 3/1992 | MacIntyre et al. | |
| 5,195,388 A | 3/1993 | Zona et al. | |
| 5,222,409 A | 6/1993 | Dalakian | |
| 5,360,071 A | 11/1994 | Bergendorf | |
| 5,385,311 A | 1/1995 | Morikawa et al. | |
| 5,427,424 A | 6/1995 | Robinson | |
| 5,435,405 A | 7/1995 | Schempf et al. | |
| 5,440,916 A | 8/1995 | Stone et al. | |
| 5,443,354 A | 8/1995 | Stone et al. | |
| 5,474,242 A | 12/1995 | Rafn | |
| 5,485,691 A | 1/1996 | Stevens et al. | |
| 5,570,992 A | 11/1996 | Lemelson | |
| 5,600,904 A | 2/1997 | Bowling | |
| 5,672,044 A | 9/1997 | Lemelson | |
| 5,769,341 A | 6/1998 | Morikawa et al. | |
| 5,842,427 A | 12/1998 | Hunter et al. | |
| 5,872,892 A | 2/1999 | Brown et al. | |
| 5,921,302 A | 7/1999 | Petersen | |
| 6,113,343 A | 9/2000 | Goldenberg et al. | |
| 6,217,094 B1 * | 4/2001 | Hanaduka et al. | 294/106 |
| 6,236,906 B1 | 5/2001 | Müller | |
| 6,283,220 B1 | 9/2001 | Carter | |
| 6,338,512 B1 | 1/2002 | Ruppert et al. | |
| 6,341,568 B1 | 1/2002 | Culley | |
| 6,341,933 B1 | 1/2002 | Gagnon et al. | |
| 6,377,872 B1 | 4/2002 | Struckman | |
| 6,431,296 B1 | 8/2002 | Won | |
| 6,491,127 B1 | 12/2002 | Holmberg et al. | |
| 6,508,496 B1 * | 1/2003 | Huang | 294/19.1 |
| 6,523,284 B1 | 2/2003 | Clugston | |
| 6,526,678 B2 | 3/2003 | Waddington, Jr. | |
| 6,615,753 B1 | 9/2003 | Culley | |
| 6,702,050 B1 | 3/2004 | Mazhar | |
| 6,722,296 B2 | 4/2004 | Reilly | |
| 6,766,973 B2 | 7/2004 | Muri | |
| 6,842,674 B2 | 1/2005 | Solomon | |
| 6,904,976 B1 | 6/2005 | Zach et al. | |
| 6,999,849 B2 | 2/2006 | Bridges | |
| 7,104,576 B1 | 9/2006 | Dorr | |
| 2004/0006824 A1 | 1/2004 | Huang | |
| 2004/0030448 A1 | 2/2004 | Solomon | |
| 2004/0030450 A1 | 2/2004 | Solomon | |
| 2004/0030451 A1 | 2/2004 | Solomon | |
| 2004/0030570 A1 | 2/2004 | Solomon | |
| 2004/0068416 A1 | 4/2004 | Solomon | |
| 2004/0134336 A1 | 7/2004 | Solomon | |
| 2005/0204850 A1 | 9/2005 | Nihei et al. | |
| 2006/0156852 A1 | 7/2006 | Haniya | |
| 2006/0192515 A1 | 8/2006 | Takayama et al. | |
| 2006/0283054 A1 | 12/2006 | Crow | |
| 2006/0289178 A1 | 12/2006 | Basek | |
| 2007/0097382 A1 | 5/2007 | Granger | |
| 2007/0107917 A1 | 5/2007 | Doherty et al. | |
| 2008/0073922 A1 * | 3/2008 | Holtz | 294/88 |
| 2008/0083344 A1 | 4/2008 | Deguire et al. | |
| 2008/0296920 A1 * | 12/2008 | Kipping et al. | 294/88 |
| 2009/0071281 A1 | 3/2009 | Fisk et al. | |
| 2009/0129003 A1 | 5/2009 | Bruck et al. | |
| 2009/0164045 A1 | 6/2009 | Deguire et al. | |
| 2010/0095799 A1 | 4/2010 | Albin et al. | |
| 2010/0101356 A1 | 4/2010 | Albin | |
| 2010/0158656 A1 | 6/2010 | Seavey | |
| 2010/0164243 A1 | 7/2010 | Albin | |

\* cited by examiner

END EFFECTOR FOR MOBILE REMOTELY CONTROLLED ROBOT

FIELD OF THE INVENTION

This invention relates to a mobile, remotely controlled robot, and more particularly to such a mobile, remotely controlled robot with an improved end effector gripper.

BACKGROUND OF THE INVENTION

Mobile, remotely controlled robots are becoming increasingly popular for use by the military, SWAT units, and police and fire departments. The applicants' TALON® robot, for example, includes an arm with an end effecter, several cameras, several antennas, and a deployable mast. Frequently the end effector is a gripper, e.g. a pair of jaws that can be opened and closed on command to grasp objects such as debris, hazardous material, unexploded ordinance and the like. The larger robots even have the capability to grip an injured, downed, person by some personal paraphernalia such as a shirt collar and drag them out of harm's way to safety. One problem with large, strong grippers is that larger gears are needed to drive the gripper fingers with sufficient torque to realize a strong grip force. But larger gears translate to larger end effector units and significant increase in their weight. Another issue with present grippers is that the gripper fingers can sag or twist on their pivot axis causing premature failure and less than optimum gripping function. Yet another issue with end effector grippers is the need to keep the motor/reduction gear package small and compact to keep down the size of the end effector unit, while still providing a strong grip force and rapid gripper closing/opening.

SUMMARY OF THE INVENTION

It is therefore an object of this invention to provide an improved end effector gripper for a mobile, remotely controlled robot.

It is a further object of this invention to provide such an improved end effector gripper for a mobile, remotely controlled robot which provides increased gripping torque (grip force).

It is a further object of this invention to provide such an improved end effector gripper for a mobile, remotely controlled robot which provides increased gripping torque without the accompanying typical increase in size and weight.

It is a further object of this invention to provide such an improved end effector gripper for a mobile, remotely controlled robot which provides increased gripping torque yet maintains a sufficient gripper range of action and speed of operation.

It is a further object of this invention to provide such an improved end effector gripper for a mobile, remotely controlled robot which reduces sag and twisting of the gripper fingers relative to their pivot axis.

It is a further object of this invention to provide such an improved end effector gripper for a mobile, remotely controlled robot which reduces the extent (axial length) of the end effector unit to facilitate co-axial alignment with robot wrist axis.

It is a further object of this invention to provide such an improved end effector gripper for a mobile, remotely controlled robot having a folded construction which allows the end effector to be mounted co-axially with the robot arm and wrist for enabling in-line wrist rotation with axial compactness.

The invention results from the realization that a strong yet compact end effector for a mobile, remotely controlled robot can be achieved with a drive subsystem that drives gear segments fixed to respective fingers for increasing the torque applied through the fingers without the normally associated increase in size; and further that a bilateral pivot pin can improve consistency and rigidity of finger operation; and that the end effector compactness can be further improved using a folded motor gear reducer drive (package).

The subject invention, however, in other embodiments, need not achieve all these objectives and the claims hereof should not be limited to structures or methods capable of achieving these objectives.

This invention features an end effector for a mobile, remotely controlled robot including first and second fingers, each finger fixed to a gear segment for rotation therewith, and a drive subsystem driving the gear segments and the associated fingers between open and closed positions.

In a preferred embodiment the fingers may be gripper fingers. The gear segments may be worm gear segments and the drive subsystem may further include a worm for driving the gear segments. The gripper finger may be fixed to its associated worm gear segment by a pivot pin on each worm gear segment. Each pivot pin may extend from both sides of its associated gear segment and each gripper finger may have at its proximal end a yoke with upper and lower spaced arms for fixedly engaging the associated pivot pin on either side of its gear segment. The worm gear segments may be the same size. The worm gear segment may be 60°. The drive subsystem may include a folded motor and gear reducer assembly. The drive subsystem may include a drive gear, the motor and gear reducer may be in side by side relationship and a first gear on the motor may drive a second gear on one end of the gear reducer and a third gear on the other end of the gear reducer may drive the drive gear. The worm may drive the worm gear segments equally, synchronously This invention also features an end effector for a mobile, remotely controlled robot including first and second fingers, each finger fixed to a worm gear segment for rotation therewith. A worm drives the worm gear segments and the associated fingers between open and closed positions. A folded motor and gear reducer gear assembly drives the worm; the worm includes a drive gear. The motor and gear reducer are in side by side relationship. A first gear on the motor drives a second gear on one end of the gear reducer and a third gear on the other end of the gear reducer drives the drive gear of the worm.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
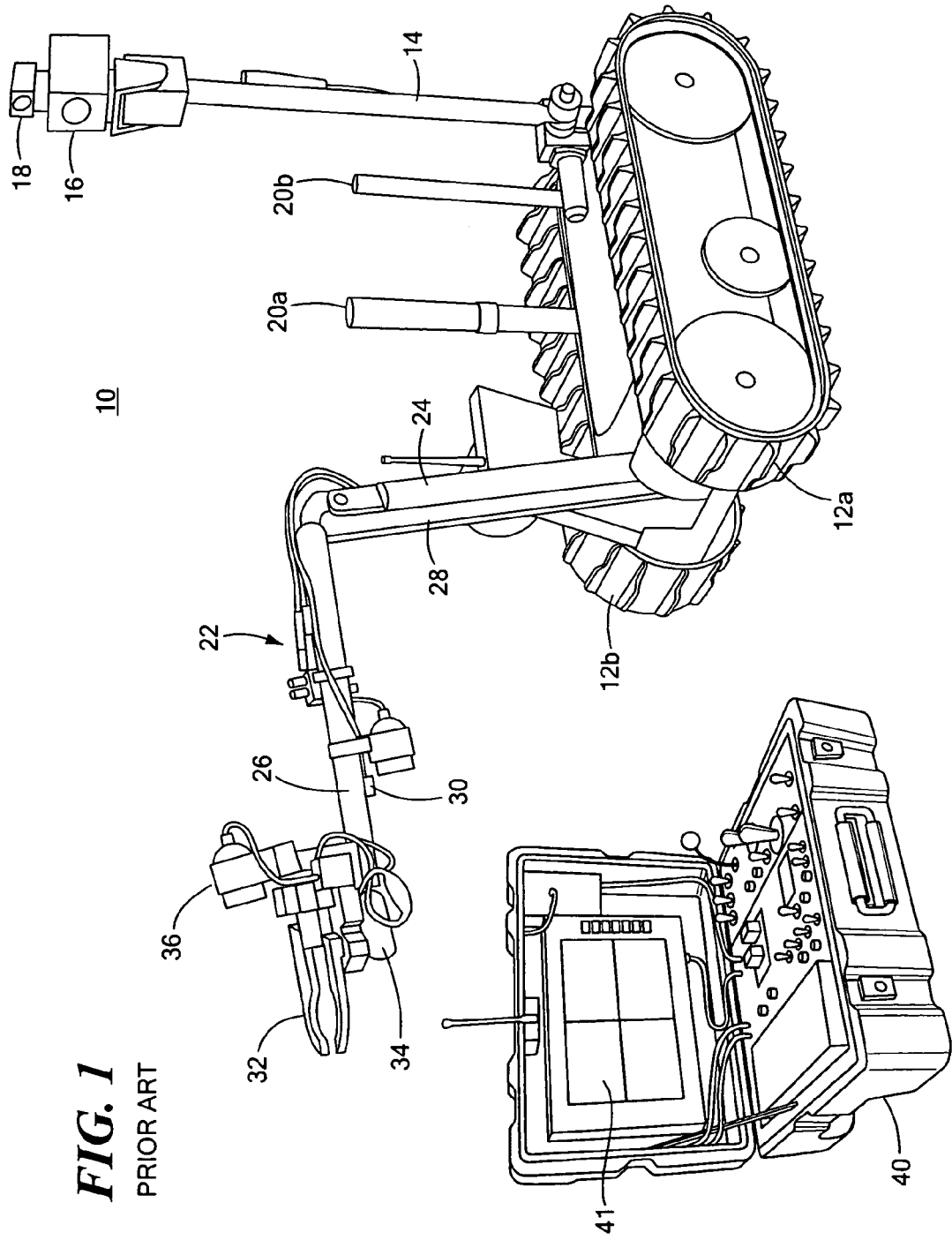
FIG. 1 a schematic three-dimensional view of conventional mobile, remotely controlled robot including upper and lower arms and an end effector gripper.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows a mobile, remotely controlled robot 10 driven by tracks 12a and 12b in accordance with one particular example of a robot in accordance with the subject invention. Robot 10 includes deployable mast 14, camera 16, light 18, antennas 20a and 20b, and arm assembly 22. Arm assembly 22 includes lower arm 24 and upper arm 26. Lower arm 24 is able to pitch up and down but it does not turn. Upper arm 26 pitches with respect to lower arm 24 and is driven by chain drive 28 extending along lower arm 24. Microphone 30 is on upper arm 26 as is gripper 32 which rotates via wrist 34. Gripper camera 36 is typically aimed at gripper 32. Operator control unit 40 is used to wirelessly control robot 10 as is known in the art. The various images captured by the cameras of the robot may be displayed on view screen 41.

Figure 2:
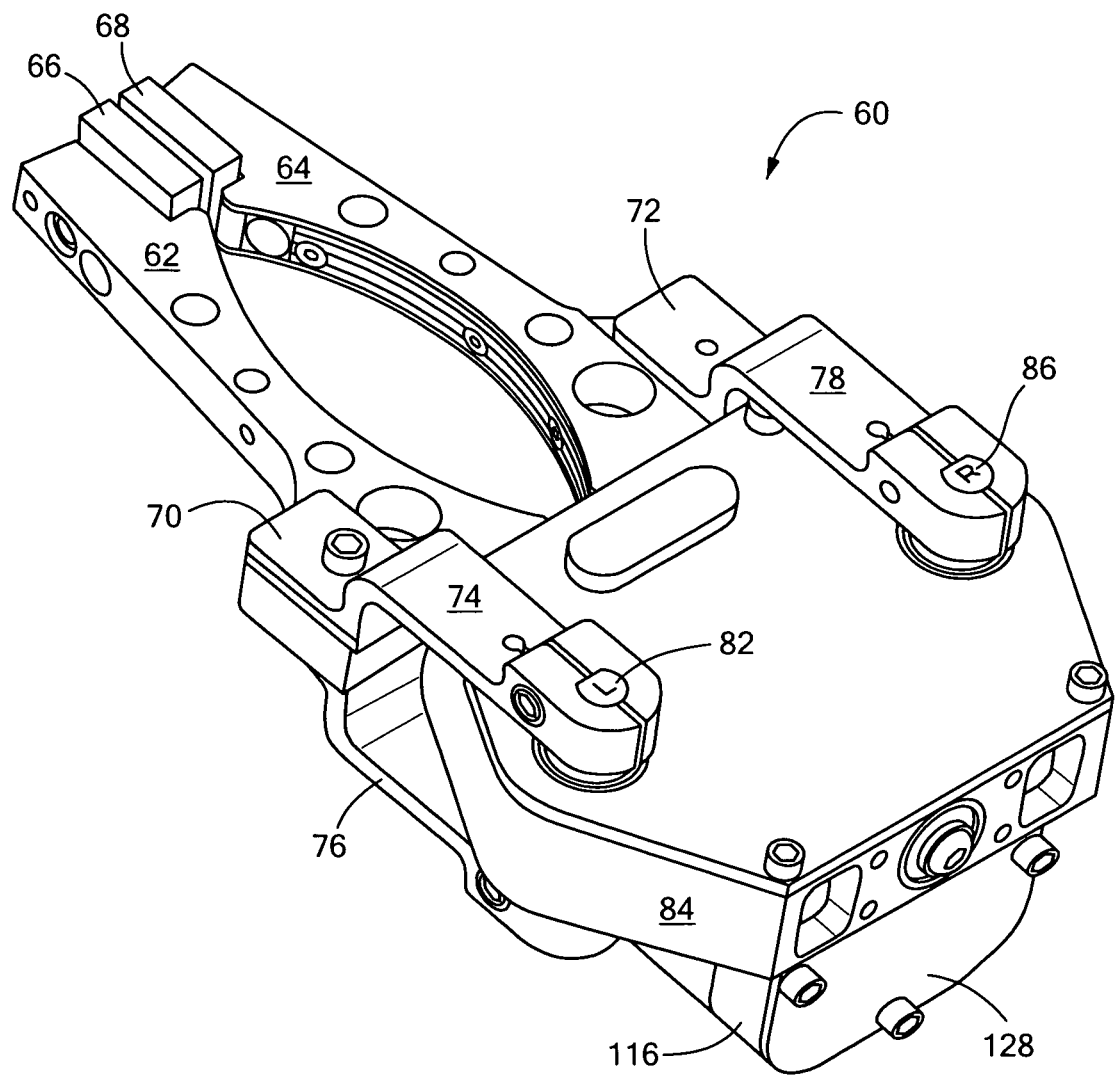
FIG. 2 is a schematic three-dimensional view of an end effector gripper according to this invention.

An end effector 60, FIG. 2, according to this invention includes a pair of fingers 62, 64 which may include gripper pads 66, 68 on their inside ends. End effector 60 is here shown as a gripper, as an example only, as any number of other functions may be accomplished, e.g. scissors, magnetic holder . . . . Each finger 62 and 64 has fixed to its proximal end a yoke 70, 72 each having two spaced arms 74, 76, 78 and 80 (not shown in FIG. 2). Arms 74 and 76 are attached to opposite ends of pivot pin 82 passing through end effector housing unit 84. Arms 78 and 80 are fixed to opposite ends of pivot pin 86 also passing through housing unit 84.

Figure 3:
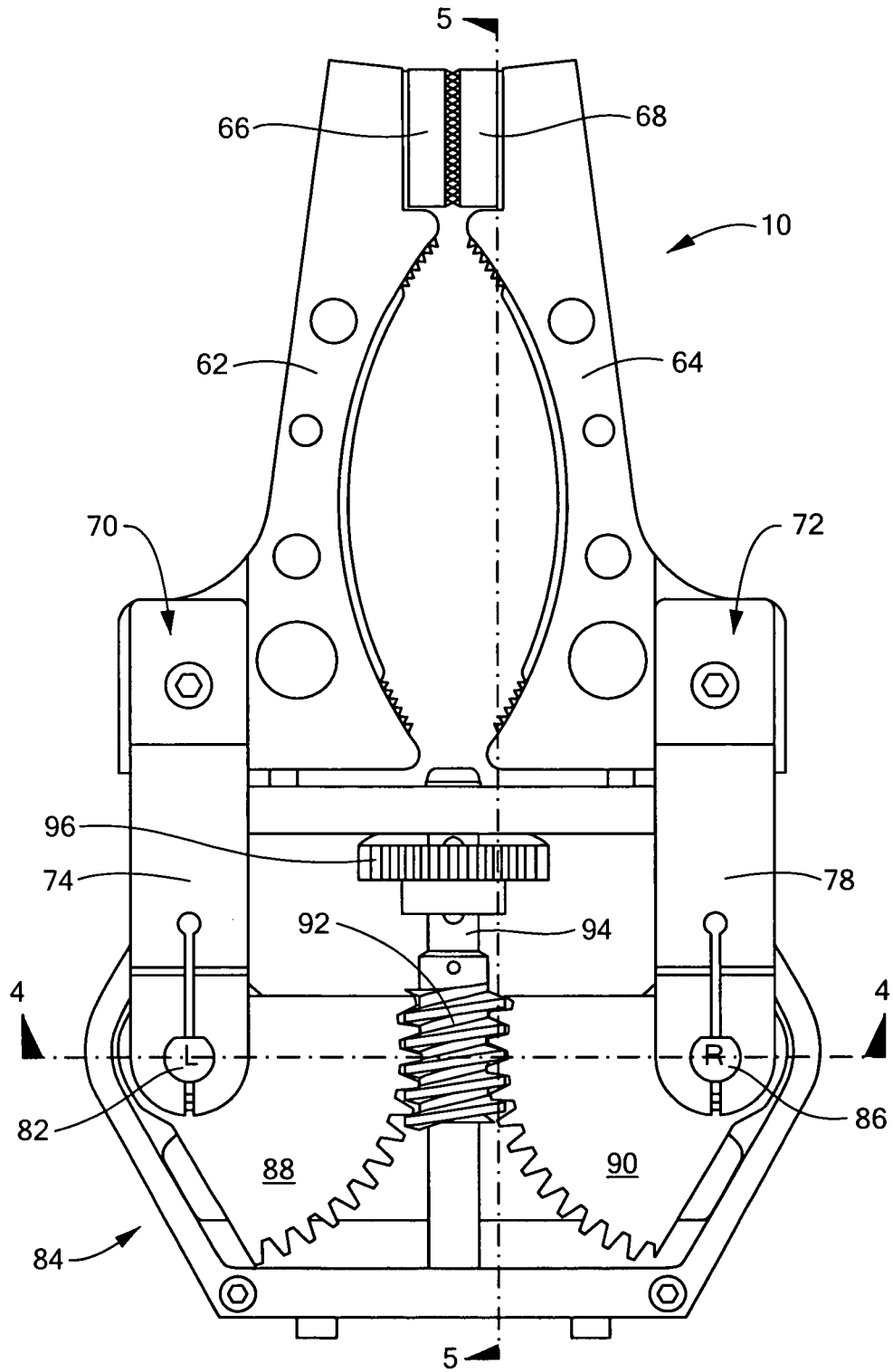
FIG. 3 is a schematic top, plan view of the gear drive mechanism for the gripper fingers of FIG. 1.
Figure 4:
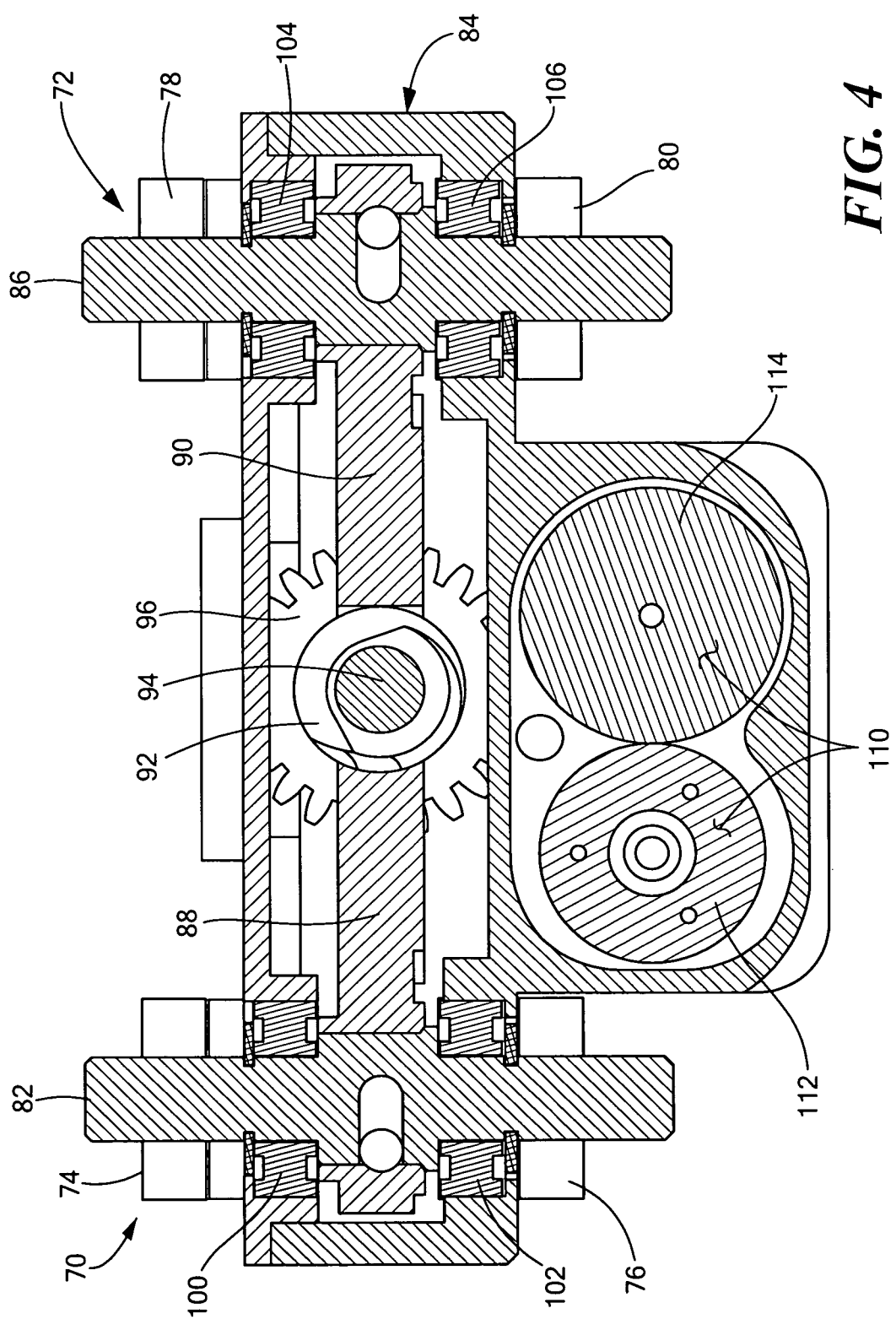
FIG. 4 is a cross-sectional view along lines 4-4 of FIG. 3.
Figure 6:
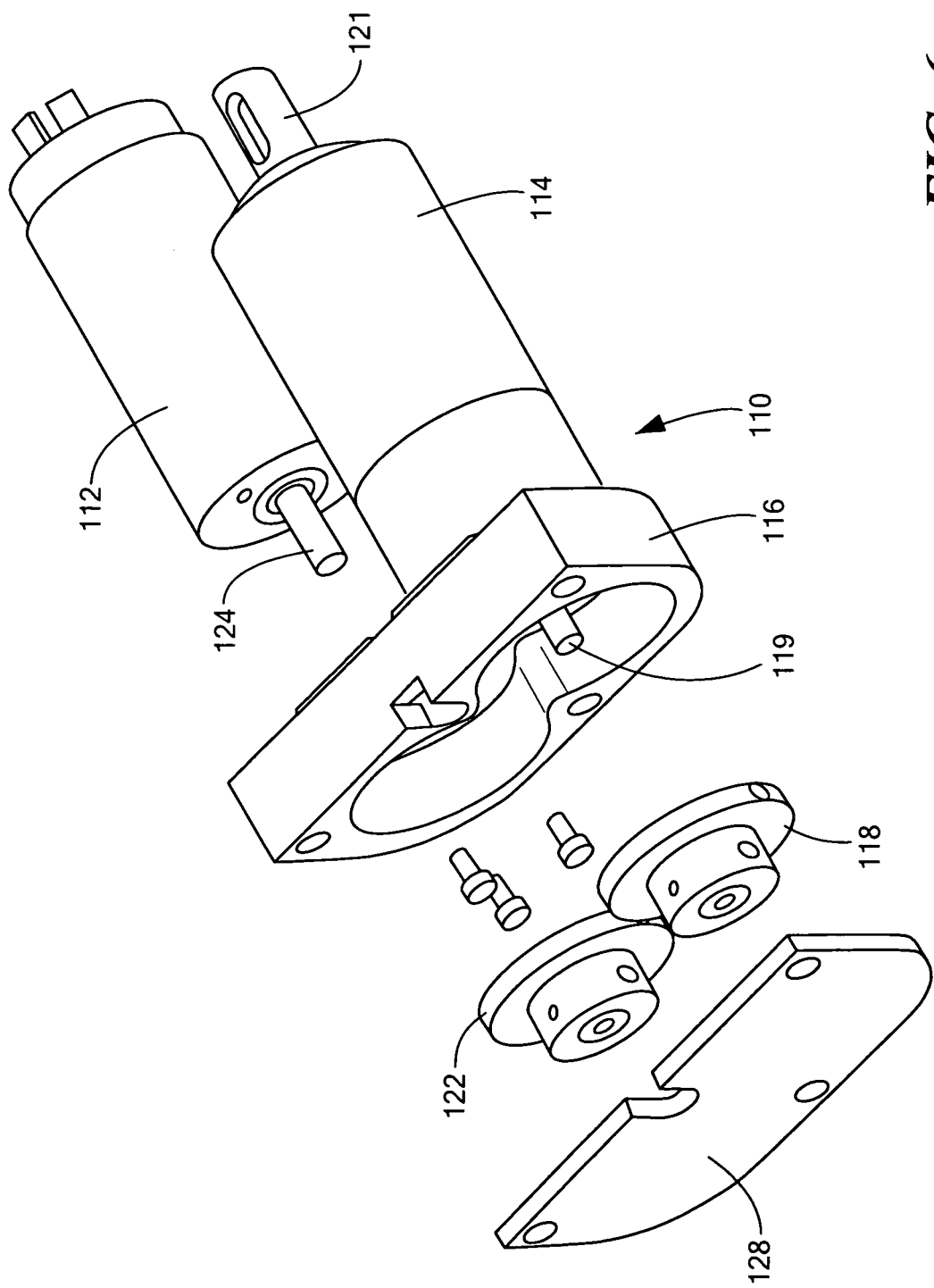
FIG. 6 is a simplified exploded three dimensional view of the folded motor and gear reducer drive package.

Inside housing unit 84, FIG. 3, are a pair of gear segments 88, 90 which in this case are shown as worm gear segments driven by worm 92 fixed to and driven by shaft 94. In this embodiment worm 92 drives each of the segments 88 and 90 synchronously equally so that fingers 62 and 64 open and close symmetrically, but this is not a necessary limitation of the invention. By using gear segments instead of fill gears the full torque providable by a gear of a given radius may be provided without requiring the space for a complete gear. That is, gear 90, for example, may be a 60° sector with a 3.125 inch pitch diameter. That means the radius of the gear is roughly half of 3.125 inches or approximately an inch and a half. Thus the housing need accommodate only a little more than an inch and a half for each gear segment plus the worm gear. If the full gear were used then the full 3.125 inches would have to be provided for each worm gear, that plus the worm would require a housing of 6 or 7 inches or more. So the torque provided by such a large gear is available without providing for a concomitant larger housing. Also fixed to shaft 94 is drive gear 96 which may be a spur gear for example. Pivot pins 82 and 86, FIG. 4, are supported in bearings 100, 102, and 104, 106, respectively, and are fixed to rotate with gear segments 88 and 90. Also contained in housing or unit 84 are folded motor and gear reducer sub-assembly 110 (see FIG. 6) including motor 112 and gear reducer 114 disposed in adjacent side by side relationship in housing 84. Each of pivot pins 82 and 86 extend beyond their respective gear segments 88 and 90 and housing 84 in both directions in order to attach to the arms 74 and 76 of yoke 70 and arms 78 and 80 of yoke 72. In this way yokes 70, 72 and their fingers 62 and 64 as well as grips 66 and 68 at their distal ends are kept more rigid and more accurately aligned even under heavy load.

Figure 5:
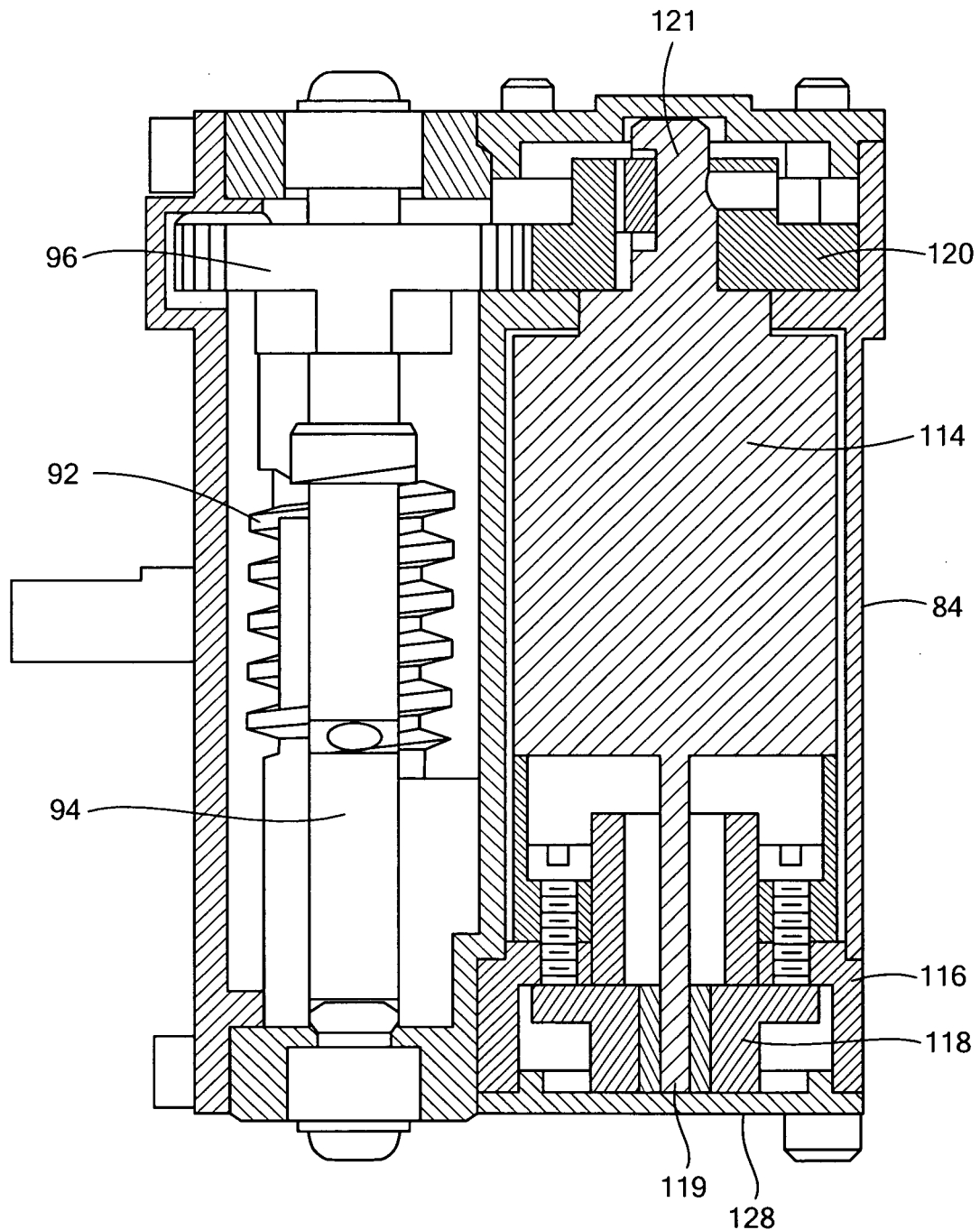
FIG. 5 is a cross-sectional view along lines 5-5 of FIG. 3 showing the motor and gear reducer drive package in a folded relationship with the final gear and worm.

Gear reducer 114, FIG. 5, includes on shaft 119 a gear 118 at one end which engages with gear 122 on shaft 124 of motor 112 and a second gear 120 on the other end on shaft 121 which engages with drive gear 96 on shaft 94 to drive worm 92. Gear 118, on shaft 119, FIG. 6, of gear reducer 114 meshes with gear 122 on output shaft 124 of motor 112. The ends of motor 112 and gear reducer 114 are mounted in transfer case 116 having a cover 128. The various gears in this folded drive sub assembly are shown as spur gears, but this is only for a preferred embodiment. This folding of the motor and gear reducer in side by side relationship and further folding of the motor-reducer with respect to the drive worm makes the end effector housing or unit much more compact. The folding of the end effector/gripper construction (for compactness, especially axially) allows the end effector/gripper to be mounted co-axially with the robot arm wrist thus achieving in-line rotation (with respect to wrist rotation axis) without making the whole thing overly long.

Figure 7:
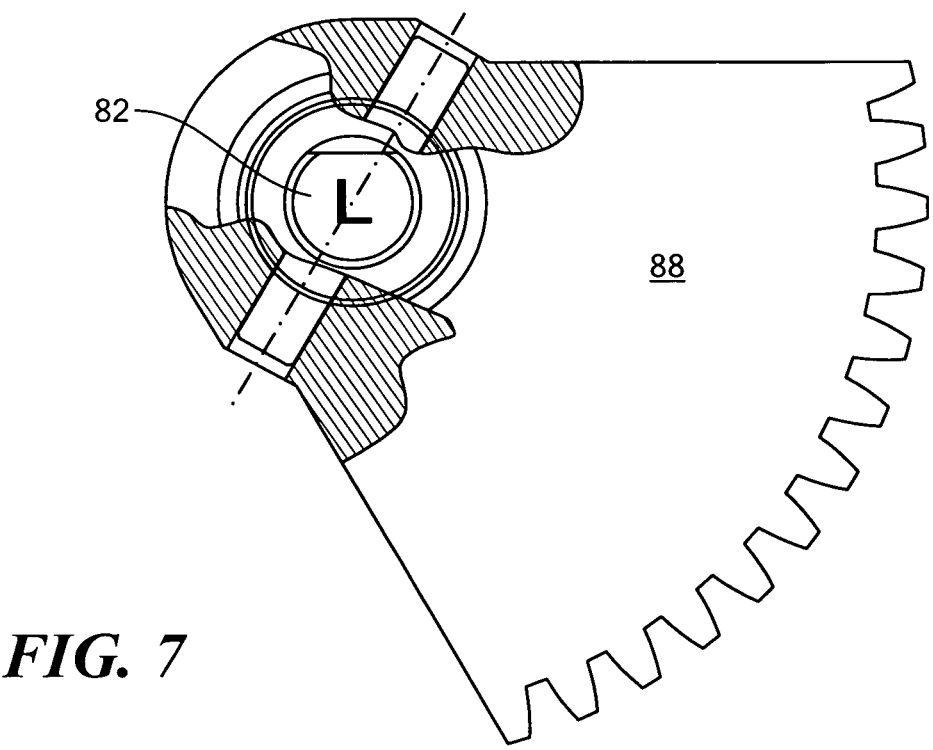
FIG. 7 is a schematic top, plan view of a worm gear segment of FIG. 3.
Figure 8:
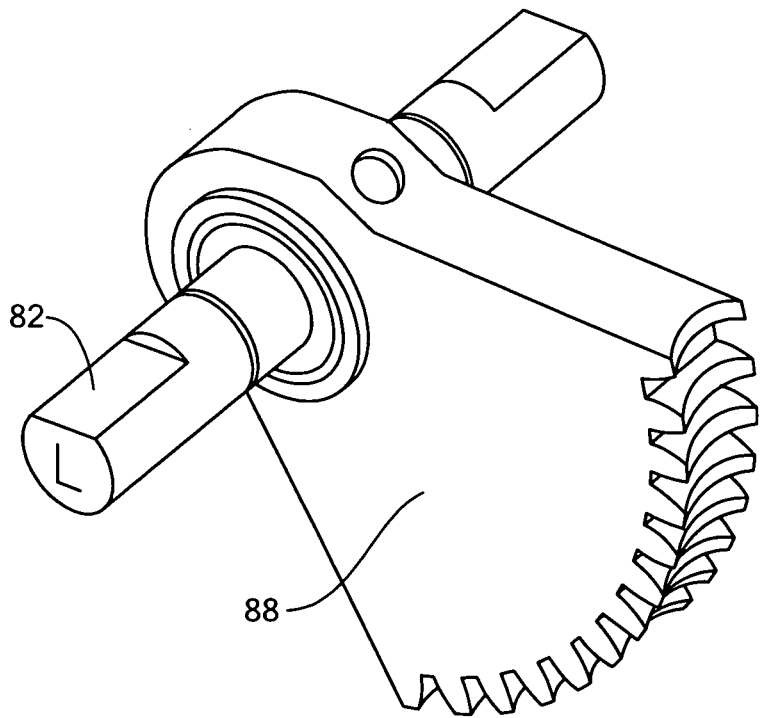
FIG. 8 is a three dimensional view of the worm gear segment of FIG. 7 showing the pivot pin extending from both sides.
Figure 9:
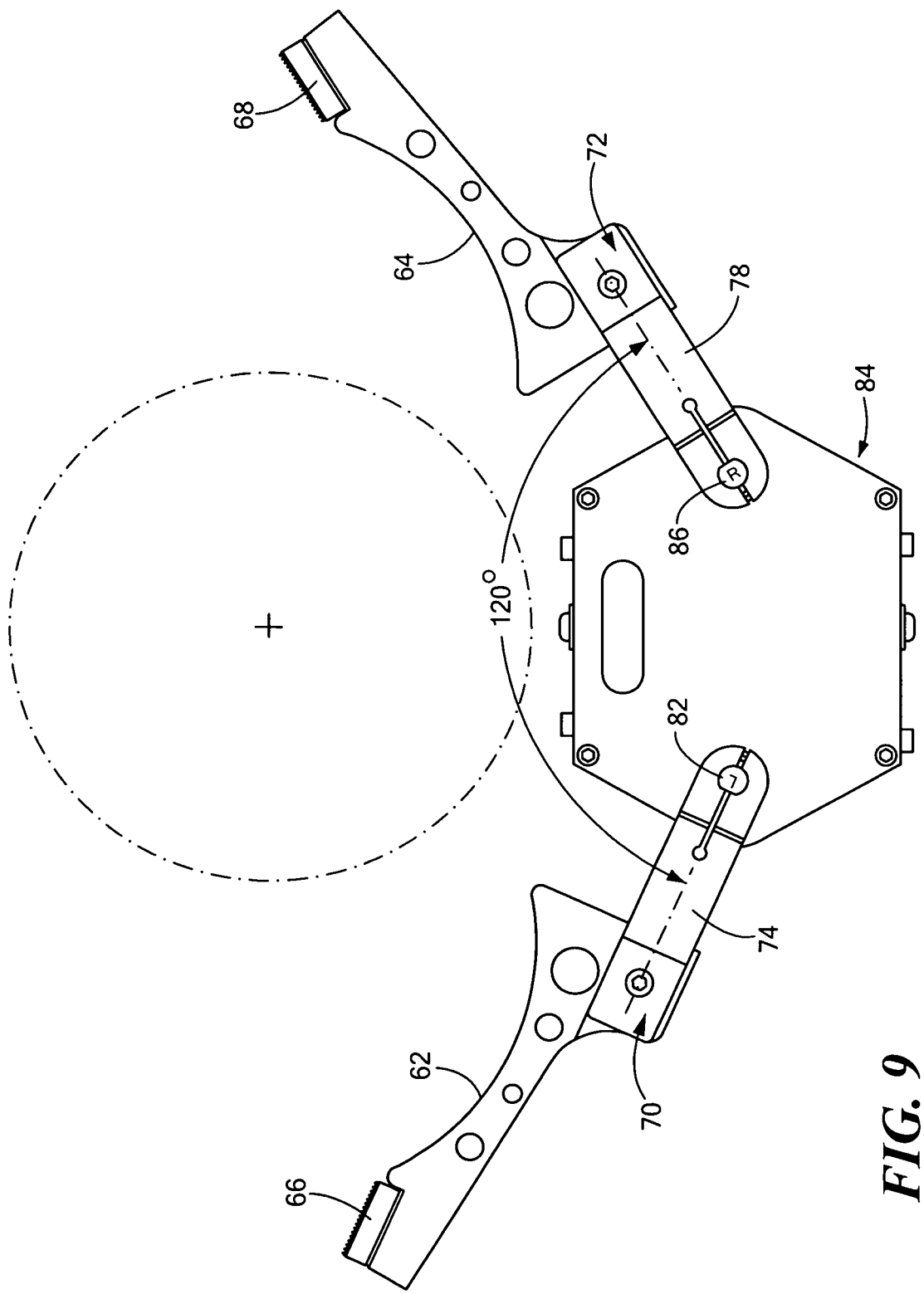
FIG. 9 is a schematic top, plan view of the gripper fingers opened to a full 120°.

The segmental structure of the gear segments 88 and 90 are shown more specifically in FIG. 7, where gear segment 88 is shown enlarged and in some detail. FIG. 8 shows the same gear segment 88 in a three dimensional view where the bilateral extension of pivot pin 82 can be seen. Gear 90 and pivot pin 86 are constructed in exactly the same way. Although the use of a gear segment instead of a full gear restricts the rotational range of the device, it can be seen, FIG. 9, that with merely a 60° sector the fingers 62 and 64 can be opened to a full 120°: a full functional range for the grippers.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An end effector for a mobile, remotely controlled robot comprising:

a housing;

first and second fingers;

a first gear segment consisting of a sector of a first full gear within said housing;

a second gear segment consisting of a sector of a second full gear within said housing;

said first finger fixed to said first gear segment and said second finger fixed to said second gear segment for rotation therewith; and a drive subsystem driving said gear segments and the associated fingers between open and closed positions.

2. The end effector of claim 1 in which the fingers are gripper fingers.

3. The end effector of claim 1 in which the gear segments are worm gear segments and the drive subsystem further includes a worm for driving the gear segments.

4. The end effector of claim 3 in which each said finger is fixed to said associated worm gear segment by a pivot pin on each said worm gear segment.

5. The end effector of claim 4 in which each said pivot pin extends from both sides of said associated gear segment and each said gripper finger has at a proximal end a yoke with upper and lower spaced arms for fixedly engaging the associated said pivot pin on either side of said gear segment.

6. The end effector of claim 3 in which said worm gear segments are the same size.

7. The end effector of claim 3 in which each said worm gear segment is a 60° sector of a full gear.

8. The end effector of claim 3 in which said worm drives said worm gear segments equally, synchronously.

9. The end effector of claim 1 in which said drive subsystem includes a folded motor and gear reducer assembly.

10. The end effector of claim 9 in which said drive subsystem includes a drive gear, said motor and a gear reducer are in side by side relationship and a first gear on the motor drives a second gear on one end of said gear reducer and a third gear on another end of said gear reducer drives said drive gear.

11. An end effector for a mobile, remotely controlled robot comprising:

first and second fingers;

each of said fingers fixed to a respective worm gear segment for rotation therewith;

a worm for driving said worm gear segments and the associated fingers between open and closed positions;

a folded motor and gear reducer assembly driving said worm; said worm including a drive gear, said motor and a gear reducer being in side by side relationship and a first gear on the motor drives a second gear on one end of said gear reducer and a third gear on another end of said gear reducer drives said drive gear of said worm.

12. An end effector for a mobile, remotely controlled robot comprising:

first and second fingers;

a first gear segment;

a second gear segment;

each of said fingers fixed to a respective gear segment for rotation therewith; and a drive subsystem driving said gear segments and the associated fingers between open and closed positions, said drive subsystem including a folded motor and gear reducer assembly and a drive gear, wherein said motor and gear reducer are in side by side relationship and a first gear on the motor drives a second gear on one end of said gear reducer and a third gear on another end of said gear reducer drives said drive gear.

13. An end effector for a mobile, remotely controlled robot comprising:

first and second fingers;

the first finger fixed to a gear segment via a yoke for rotation therewith, said yoke including an upper spaced arm above and a lower spaced arm below said gear segment;

the second finger fixed to a second gear segment via a second yoke for rotation therewith, said second yoke including an upper spaced arm above and a lower spaced arm below said second gear segment; and a drive subsystem driving said gear segments, said yokes, and the associated fingers between open and closed positions.

14. The end effector of claim 13 further including a housing, wherein the gear segments are within the housing, and the arms of the first and second yokes are external to the housing.

* * * * *